No. 887,364. PATENTED MAY 12, 1908.
W. H. WEASER.
EYEGLASSES.
APPLICATION FILED JAN. 12, 1905. RENEWED NOV. 29, 1907.
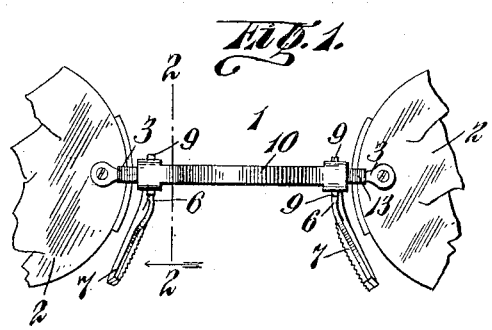
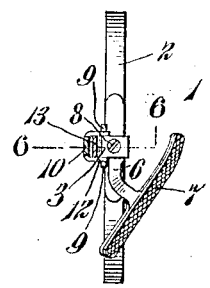
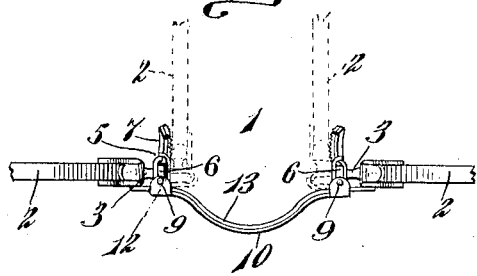
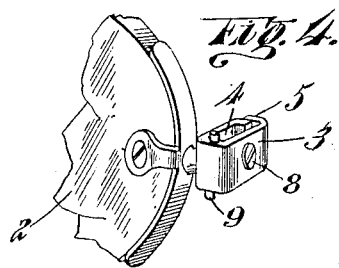
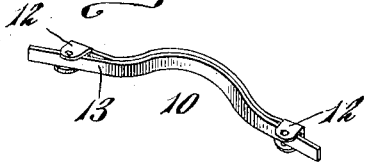
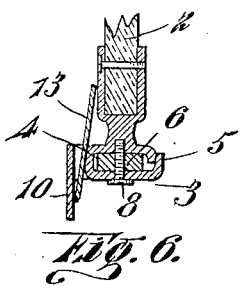
Witnesses
Eugene M. Slineys
G. H. Griesbauer
Inventor
William H. Weaser.
by H. B. Wilson
Attorney
THE NORRIS PETERS CO., WASHINGTON, D. C.

UNITED STATES PATENT OFFICE.

WILLIAM HENRY WEASER, OF PITTSFIELD, MASSACHUSETTS, ASSIGNOR, BY MESNE ASSIGNMENTS, TO DANIEL WOOLF AND MICHAEL WOOLF, OF NEW YORK, N. Y.

EYEGLASSES.

No. 887,364.    Specification of Letters Patent.    Patented May 12, 1908.

Application filed January 12, 1905, Serial No. 240,781. Renewed November 29, 1907. Serial No. 404,378.

*To all whom it may concern:*

Be it known that I, WILLIAM HENRY WEASER, a citizen of the United States, residing at Pittsfield, in the county of Berkshire and State of Massachusetts, have invented certain new and useful Improvements in Eyeglasses; and I do declare the following to be a full, clear, and exact description of the invention, such as will enable others skilled in the art to which it appertains to make and use the same.

This invention relates to improvements in eyeglasses.

The object of the invention is to provide an improved construction and arrangement of stud whereby the bow and nose guards may be firmly attached to the glasses, means being provided whereby the nose guards may be caused to firmly hold the glasses in place on the nose.

With the above and other objects in view, the invention consists of certain novel features of construction, combination and arrangement of parts, as will be hereinafter described and claimed.

In the accompanying drawings:—Figure 1 is a front view of a portion of a pair of eyeglasses, constructed in accordance with the invention; Fig. 2 is a vertical sectional view on the line 2—2 of Fig. 1; Fig. 3 is a top plan view of the parts as shown in Fig. 1, and showing in dotted lines the folded position of the same; Fig. 4 is a detail perspective view of the stud and a portion of one lens; Fig. 5 is a detail perspective view of the inner side of the bow, showing the arrangement of the spring on the inner side of the same; and Fig. 6 is a horizontal sectional view on the line 6—6 of Fig. 2.

Referring more particularly to the drawings, 1 denotes an eyeglass having the usual lenses 2 which are connected to studs or clamps 3 provided with the usual vertically disposed slot 4. The studs 3 are preferably formed of a single piece of metal open on their rear or inner sides, one portion of the same being bent to form a flap and overlapping the other or body portion, as shown at 5, the body portion being preferably provided with an ear at one end.

Through the open slots 4 are adapted to be inserted arms 6 of nose guards 7, said arms being secured in the slots 4 in any suitable manner, but are here shown as secured by means of a screw 8. By forming the studs open, as shown at 5, the slot 4 therein may be adjusted to accommodate various thicknesses of nose guard arm without disconnecting or loosening the pivotal connections of the bow or bridge 10, or interfering with the connections of the lenses to the clamps.

On the studs 3 are arranged means for pivoting the bridge thereon, shown as upwardly and downwardly projecting ears or pivot pins 9, said pins being here shown as arranged on the forward or outer sides of the studs so that the guards will swing away from each other when the lenses are opened outwardly. The same, however, may be arranged in any suitable position upon the studs.

10 denotes the eyeglass bow or bridge which is here shown as an outwardly curved stiff or rigid bar having formed on its ends laterally projecting, parallel, apertured lugs 12 with which are pivotally engaged the pins 9 on the studs 3, thereby pivotally connecting said studs and eyeglass lens with said bow. Arranged on the bow 10 and preferably secured to the inner side of the same is a flat leaf spring 13 the ends of which project beyond the ends of the bow 10 and are adapted to bear upon the lens attaching lugs of the studs 3 forming stops. The tension of the spring is to normally force the studs 3 and the lenses 2 inwardly toward each other, so that when the glasses are applied to the nose of the wearer, the nose guards 7 will be forced into firm engagement with the nose, thereby holding the glasses in place.

In folding the lenses 2 into the position shown in dotted lines in Fig. 3, the spring 13 bears against the stud post, so that the lenses are held in either their open or closed positions by the tension of said spring against the flat side edge or the front side portion of the stud post, as will be obvious upon reference to Fig. 6 of the drawing.

While I have shown and described the spring 13 as being a flat leaf spring secured to the inner side of the bow 10, it is obvious that the spring may be of any suitable shape and if desired may be formed in two parts and may be also secured to the front or outer side of or in any suitable position upon the bow. By pivotally connecting the studs 3 to the ends of the bow, as herein shown and described, the lenses are adapted to be folded inwardly or rearwardly toward each other when not in use, as shown in dotted lines in Fig. 3 of the drawings.

Eyeglasses constructed as herein shown and described may have applied thereto any suitable form of nose guards and will be found to possess many advantages over the common form of eyeglass construction now in use.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention.

Having thus described my invention, what I claim as new and desire to secure by Letters-Patent, is:—

1. Eye glasses having clamps provided with means for supporting lenses, a stiff or rigid bridge pivotally connected to the clamps, nose guards, and provision on the clamps permitting the attachment and detachment of said nose guards without interfering with the connections of the lenses and pivotal connections of the stiff bridge to the clamps.

2. Eye glasses having clamps provided with means for supporting lenses, a stiff or rigid bridge pivotally connected to the clamps, nose guards, and provision on the clamps permitting the attachment and detachment of said nose guards without disconnecting or loosening the pivotal connections of the stiff bridge or interfering with the connections of the lenses to the clamps.

3. A lens clamp for eye glasses provided with means for supporting the lens, means for pivoting a bridge therein, and means for detachably connecting a guard thereto, independently of the provision for supporting the lens.

4. A lens clamp for eye glasses provided with means for supporting the lens, means for pivoting a bridge thereon, and separate means for detachably connecting a guard thereto independently of the provision for holding the lens and the pivotal bridge connections.

5. A lens clamp for eyeglasses provided with lens supporting means, means for pivotally receiving a bridge end, and means independent of said lens supporting and bridge receiving means for detachably receiving a nose guard.

6. Eye glasses having clamps provided with lens supporting means, means for pivotally receiving bridge ends, means independent of said lens supporting and bridge receiving means for detachably receiving nose guards, and a stiff or rigid bridge having its ends pivotally connected to said clamps.

7. Eye glasses having clamps provided with lens supporting means, means for pivotally receiving bridge ends, means independent of said lens supporting and bridge receiving means for detachably receiving nose guards, a stiff or rigid bridge having its ends pivotally connected to said clamps, and springs bearing against said bridge.

8. Eyeglasses having lens clamps provided with means for supporting the lenses, means for pivoting a bridge thereon, means for detachably connecting guards thereto, independently of the provision for supporting the lenses, and a stiff or rigid bridge pivoted at each end to said clamps.

9. Eye glasses having lenses, lens clamps and boxes, nose guards connected to the boxes, and a bridge pivotally connected to the boxes, the pivotal portions of said bridge being located forwardly of the lenses when said lenses are in normal position, whereby the nose guards are moved away from each other when the lenses are swung forwardly with relation to the bridge.

10. Eye glasses having lenses, lens clamps provided with studs, boxes connected to said studs, and a bridge pivotally connected to the boxes, the pivotal connections of said bridge being located forwardly of the studs.

11. A mounting for eye glasses comprising a nose bridge, a pair of lenses, and a lens support pivoted at each end portion of said nose bridge, the points of pivotal connection of said lens supports with said nose bridge lying in a plane beyond the planes of the outer faces of said lenses, substantially as and for the purposes set forth.

12. A mounting for eye glasses comprising a nose bridge, a pair of lenses and a lens support pivoted at each end portion of said nose bridge, the points of pivotal connection of said lens supports with said nose bridge lying in a plane beyond the planes of the outer faces of said lenses, and a spring between each lens support and a portion of the nose bridge, substantially as and for the purpose set forth.

13. A lens clamp for eye glasses having means for pivoting a bridge thereto, and a box independent of the lens supporting portion and pivoting means, for connecting a guard to the clamp.

14. A lens clamp for eye glasses having means for pivoting a bridge thereto, and a box independent of the pivoting means and lens holding means, for detachably connecting a guard to the clamp.

15. Eye glasses having lens clamps, pivoting means on said clamps, a bridge pivotally connected to said pivoting means, recessed boxes on said clamps, and guards connected to said boxes independently of the pivoting means for the bridge.

16. Eye glasses having lens clamps, pivoting means on said clamps, a bridge pivotally connected to said pivoting means, recessed boxes on said clamps, and guards detachably connected to said boxes independently of the pivoting means for the bridge.

17. Eye glasses having lenses, lens clamps provided with studs, boxes connected to said studs and provided with means located forwardly of the studs for pivotally receiving bridge ends, and a bridge pivoted to said bridge end receiving means.

18. Eye glasses having lenses, lens clamps and boxes, said boxes being each composed of a single piece of metal bent upon itself to form a body portion and a flap, and a bridge pivoted to said boxes.

19. Eye glasses having lenses, lens clamps and boxes, said boxes being each composed of a single piece of metal bent upon itself to form a body portion and a flap, and a bridge pivoted to the forward ends of said boxes.

20. Eye glasses provided with lenses, lens clamps and boxes, each of said boxes comprising a single piece of metal having a body portion, an ear and a bridge receiving portion, and a bridge pivoted to said bridge receiving portions.

21. Eye glasses provided with lenses, lens clamps and boxes, each of said boxes comprising a single piece of metal having a body portion, one end of said piece of metal being bent to form an ear, and the remainder of said piece of metal being bent upon itself to form a flap adapted to lie opposite the body portion, and a bridge pivoted to each of said boxes.

22. A box for eye glasses, comprising a single piece of metal, one end of which is bent to form an ear, and the other end being bent upon itself to form a flap.

23. A box for eye glasses, comprising a single piece of metal having a body portion, an ear at one end of said body portion, and means for pivotally receiving a bridge end at the other end of said body portion.

24. Eye glasses having a lens, a lens clamp, and a box provided with means for pivotally receiving a bridge end located forwardly of the clamp.

25. Eye glasses having a lens, a lens clamp, a box provided with means for pivotally receiving a bridge end located forwardly of the clamp, and a nose guard detachably connected to the box.

26. A mounting for eye glasses comprising a nose bridge, a pair of lenses, and a lens support pivoted at each end portion of said nose bridge, the points of pivotal connection of said lens support with said nose bridge lying in a plane beyond the planes of the outer faces of said lenses, and means for limiting the pivotal movements of the parts, substantially as and for the purposes set forth.

27. A mounting for eye glasses comprising a nose bridge, a pair of lenses, and a lens support pivoted at each end portion of said nose bridge, the points of pivotal connection of said lens supports with said nose bridge lying in a plane beyond the planes of the outer faces of said lenses, and a spring between each lens support and a portion of the nose bridge, and means for limiting the pivotal movements of the parts, substantially as and for the purposes set forth.

28. In eyeglasses, the combination with the lenses, of studs secured thereto, nose guards removably attached to said studs, pivot pins arranged on the latter, a bow having on its ends laterally projecting apertured lugs to engage said pins and a spring carried by said bow to engage said studs and force said lenses inwardly, thereby causing said nose guards to support the glasses on the nose of the wearer, and to hold them in parallel relation when not in use, substantially as described.

29. A lense clamp for eye glasses having ears for pivoting a bridge thereon, and a box independent of the lens supporting portion and ears for connecting a guard to the clamp.

30. A lens clamp for eye glasses having ears for pivoting a bridge thereon, and a box independent of the ears and means for holding the lens, for detachably connecting a guard to the clamp.

31. Eye glasses having lens clamps, ears on said clamps, a bridge pivotally connected to said ears, recessed boxes on said clamps, and guards connected to said boxes independently of the ears for the bridge.

32. Eye glasses having lens clamps, ears on said clamps, a bridge pivotally connected to said ears, recessed boxes on said clamps, and guards detachably connected to said boxes independently of the ears for the bridge.

In testimony whereof I have hereunto set my hand in presence of two subscribing witnesses.

WILLIAM HENRY WEASER.

Witnesses:
 JAMES FALLON,
 AUGUSTUS J. BUFFINTON.